United States Patent [19]
Lapeyre

[11] 3,812,271
[45] May 21, 1974

[54] METHOD FOR EXTRACTING MEATS FROM CRUSTACEANS

[76] Inventor: James M. Lapeyre, 13 Richmond Pl., New Orleans, La. 70115

[22] Filed: May 7, 1973
[21] Appl. No.: 357,556

[52] U.S. Cl. ............... 426/312, 426/442, 426/478
[51] Int. Cl. ............................................. A22c 29/00
[58] Field of Search ............ 99/111, 195; 17/48, 73; 426/312

[56] References Cited
UNITED STATES PATENTS
2,978,334   4/1961   Lapeyre .............................. 99/195
3,471,894   10/1969  Tasker ................................. 17/48

Primary Examiner—A. Louis Monacell
Assistant Examiner—R. A. Yoncoskie
Attorney, Agent, or Firm—Wilkinson, Mawhinney & Theibault

[57] ABSTRACT

The present disclosure is directed to a method of removing the edible meat from crustacea by cooking or not cooking the crustacea such as a crab to coagulate the protienatious mass and freezing same to prevent injury thereto during shell removal which first consists of subjecting the crab to a vacuum and breaking the vacuum to permit the sucking into the exoskeletal shell of a mixture of explosive gas and air which is then ignited causing an explosion of the exoskeletal shell away from the edible meat and the meats and shell fragments are subsequently separated.

7 Claims, 1 Drawing Figure

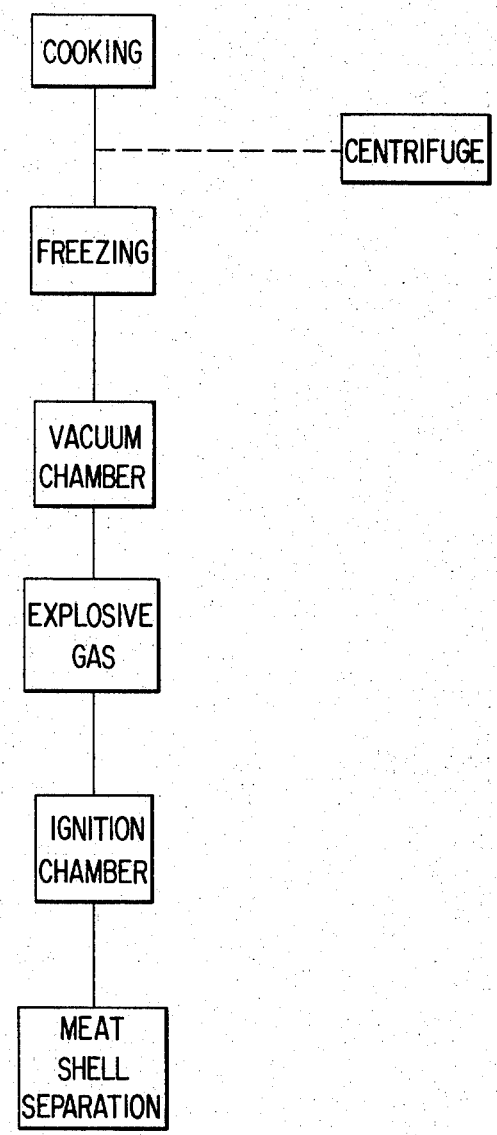

METHOD FOR EXTRACTING MEATS FROM CRUSTACEANS

The present method is directed to an improvement over my prior U.S. Pat. No. 2,978,334, granted Apr. 4, 1961, entitled PROCESS FOR EXTRACTING MEATS FROM CRUSTACEANS in that the crustaceans by way of example crabs may be either cooked or uncooked prior to freezing and may be either subjected to the G-forces of a centrifuge prior to, or during freezing, to compact the meat in the exoskeletal shell to leave a chamber between the meat and the shell which may be subjected to a vacuum which is destroyed and replaced with a mixture of explosive gas which is subsequently ignited to explode the exoskeletal shell away from the edible meat. The prior art of which I am aware does not teach replacing the vacuum within the exoskeletal shell structure with an explosive gas/air mixture which will be ignited to destroy the exoskeletal shell structure. In my prior patent the crab was pressurized to buildup a pressure within the exoskeletal structure and the gaseous pressure was suddenly released to induce explosion of the shell which was not as positive and sudden as causing an explosion from within the exoskeletal shell structure.

In the drawing is depicted a block flow chart of the process in accordance with the present method.

In starting with for example crabs or lobsters, they may be either cooked or raw. They are thereafter frozen to rigidify the edible meat to protect it from damage during subsequent steps of the process. The crustacea may be subjected to the increase in G-force of a centrifuge to compact the meat at one end of the exoskeletal shell during the freezing process to define a positive chamber within the exoskeletal shell structure which may first be subjected to a vacuum to remove air and moisture followed by charging the chamber when the vacuum is destroyed in the presence of an explosive gas/air mixture, with the explosive mixture which is ignited as by passing the crustacea through an open flame which will ignite the gaseous mixture causing an explosion of the exoskeletal shell away from the edible meat at which time, the meat still being frozen and rigid will not be injured by flying shell segments. An operative explosive gaseous/air mixture is a mixture of natural gas and air.

After the explosion of the exoskeletal structure the meat and shell segments fall into a refrigerated brine tank where the meats float and the shells sink. The meats are then skimmed off the top of the brine solution.

While I have used the generic word crustacea which includes shrimp, crawfish, lobsters and crabs I reserve the right to the entire scope of crustacea upon which the present method is found to be operative.

What I claim is:

1. The method of extracting meats from crustacea comprising:
   a. cooking the crustacea,
   b. thereafter freezing the cooked crustacea to rigidify the meat within the exoskeletal shell,
   c. subjecting the thus cooked and rigidified crustacea to a vacuum to remove air from between the rigidified meat and the exoskeletal shell,
   d. breaking the vacuum within the crustacea between the meat and shell by introducing an explosive gaseous mixture into the area between the rigidified meat and the exoskeletal shell,
   e. thereafter igniting the explosive gaseous mixture exploding the crustacea in the frozen state driving the exoskeletal shell away from the meat, and
   f. separating the exploded shell from the edible meat.

2. The method of claim 1 further comprising subjecting the cooked crustacea to a centrifugal G-force during freezing to cause compaction of the meat within the exoskeletal shell to leave a void into which the explosive gaseous mixture is introduced.

3. The method of claim 1 wherein the cooked-frozen crustacea is placed in a vacuum chamber to withdraw air from the void between the frozen meat and exoskeletal shell.

4. The method of claim 1 wherein the vacuum within the exoskeletal shell is broken by introduction of a natural gas/air mixture into the void between the cooked-frozen meat and the exoskeletal shell.

5. The method of claim 1 wherein the ignition of the explosive gases in the crustacea shell is accomplished by passing the crustacea containing the explosive gas through a chamber having an open flame which ignites the gas.

6. The method of claim 1 wherein the separation of edible meat from exploded shell fragments is attained by allowing the mixture of shell segments and frozen meats to fall into a brine solution where the meats float and the shell segments sink followed by skimming off the meats.

7. The method of extracting meats from crustacea comprising:
   a. freezing the crustacea to rigidify the meat within the exoskeletal shell,
   b. subjecting the thus rigidified crustacea to a vacuum to remove air from between the rigidified meat and the exoskeletal shell,
   c. breaking the vacuum within the crustacea between the meat and shell by introducing an explosive gaseous mixture into the area between the rigidified meat and the exoskeletal shell,
   d. thereafter igniting the explosive gaseous mixture exploding the crustacea in the frozen state driving the exoskeletal shell away from the meat, and
   e. separating the exploded shell from the edible meat.

* * * * *